United States Patent
Pefkianakis et al.

(10) Patent No.: US 12,316,394 B2
(45) Date of Patent: May 27, 2025

(54) NON-LINE-OF-SIGHT DETECTION

(71) Applicant: Apple Inc., Cupertino, CA (US)

(72) Inventors: Ioannis Pefkianakis, Palo Alto, CA (US); Weiping Dou, San Jose, CA (US); David B. Cheung, Los Gatos, CA (US); Ye Sun, San Jose, CA (US); Faraz Faheem, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/453,554

(22) Filed: Aug. 22, 2023

(65) Prior Publication Data

US 2023/0412291 A1    Dec. 21, 2023

Related U.S. Application Data

(63) Continuation of application No. 16/562,777, filed on Sep. 6, 2019, now Pat. No. 11,770,198.

(51) Int. Cl.
| | |
|---|---|
| *H04B 17/336* | (2015.01) |
| *H04B 17/00* | (2015.01) |
| *H04B 17/17* | (2015.01) |
| *H04L 1/00* | (2006.01) |
| *H04L 5/00* | (2006.01) |

(52) U.S. Cl.
CPC ....... *H04B 17/336* (2015.01); *H04B 17/0085* (2013.01); *H04B 17/17* (2015.01); *H04L 1/0026* (2013.01); *H04L 5/0051* (2013.01); *H04L 5/0073* (2013.01)

(58) Field of Classification Search
CPC .. H04B 17/336; H04B 17/0085; H04B 17/17; H04B 7/0691; H04B 7/0874; H04B 7/088; H04B 7/0695; H04L 1/0026; H04L 5/0051; H04L 5/0073
See application file for complete search history.

(56) References Cited

U.S. PATENT DOCUMENTS

| | | |
|---|---|---|
| 9,002,378 B2 | 4/2015 | Levin |
| 9,628,311 B2 | 4/2017 | Bertrand |
| 9,832,780 B2 | 11/2017 | Burstrom |

(Continued)

OTHER PUBLICATIONS

Wang et al, "Antenna Selection and Transmit Beamforming Switching Scheme for a MIMO System Operating over a Varying Rician Channel", 2009 2nd International Congress on Image and Signal Processing, Oct. 17-19, 2009. (Year: 2009).*

(Continued)

*Primary Examiner* — Charles C Jiang
*Assistant Examiner* — Shawn D Miller
(74) *Attorney, Agent, or Firm* — Kowert, Hood, Munyon, Rankin & Goetzel, P.C.

(57) ABSTRACT

A wireless device can perform non-line-of-sight detection. The wireless device may establish a wireless link with another wireless device using a wireless channel. The wireless device may perform one or more channel measurements for the wireless channel. The wireless device may determine whether a line-of-sight path is available for the wireless channel based at least in part on the one or more channel measurements. The wireless device may determine whether to trigger beamforming selection, antenna selection, and/or any other link maintenance operations based at least in part on the determined line-of-sight availability.

20 Claims, 10 Drawing Sheets

(56) References Cited

U.S. PATENT DOCUMENTS

| | | |
|---|---|---|
| 10,045,161 B2 | 8/2018 | Cardoso de Moura |
| 11,075,929 B1 | 7/2021 | Li |
| 2015/0055562 A1 | 2/2015 | Shulman |
| 2015/0188678 A1 | 7/2015 | Wu |
| 2016/0033613 A1 | 2/2016 | Hahn |
| 2016/0262156 A1 | 9/2016 | Yilmaz |
| 2019/0364535 A1 | 11/2019 | Sadiq |
| 2020/0267681 A1 | 8/2020 | Ferrari |
| 2021/0013946 A1 | 1/2021 | Coldrey |
| 2021/0239783 A1* | 8/2021 | Calcev .................... G01S 11/08 |
| 2023/0288517 A1* | 9/2023 | Walk ..................... G01S 5/0218 |

OTHER PUBLICATIONS

Geng et al.; "Millimeter-Wave Propagation Channel Characterization for Short-Range Wireless Communications"; 1 IEEE Transactions on Vehicular Technology, vol. 58, No. 1; May 7, 2008.

\* cited by examiner

NON-LINE-OF-SIGHT DETECTION

PRIORITY INFORMATION

This application is a continuation of U.S. patent application Ser. No. 16/562,777, entitled "Non-Line-of-Sight Detection," filed Sep. 6, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to wireless communication, including to techniques for performing non-line-of-sight detection in a wireless communication system, such as an IEEE 802.11 wireless system.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), Bluetooth, and others.

Wireless communication systems may make use of a variety of wireless spectrum portions. These different frequency ranges may have differing propagation characteristics. For example, some frequency ranges may be more vulnerable to channel propagation loss than others, and/or may experience more channel degradation from line-of-sight blockages than others. For wireless devices that perform wireless communication in such spectrum, whether line-of-sight is available may have a significant impact on the ability of the wireless devices to perform the wireless communication, such that link failure or breakage can possibly occur when line-of-sight is not available. Accordingly, improvements in this domain would be desirable.

SUMMARY

Embodiments described herein relate to a method for determining whether line-of-sight is available for a wireless channel. A wireless device may establish a wireless link with another wireless device, using a wireless channel. The wireless channel may include a portion of the electromagnetic spectrum with wavelengths approximately on the order of millimeters, in some instances. The wireless device may perform channel measurements of the wireless channel, for example including measuring signal to noise ratio, channel impulse response, and/or any of various other metrics.

Using the channel measurements, the wireless device may determine whether line-of-sight is available for the wireless link. For example, at least in some instances, a wireless channel that is strongly impacted by whether line-of-sight is available (as may commonly be the case in millimeter wavelength portions of the electromagnetic spectrum) may exhibit substantially greater channel stability when line-of-sight is available than when line-of-sight is not available. Thus, in such a scenario, it may be possible to compare the channel measurements (and/or one or more metrics derived from the channel measurements) with certain thresholds to classify whether the channel stability of the wireless channel is characteristic of a wireless channel without line-of-sight, or of a wireless channel with line-of-sight.

Further, it may be possible to repeat such determination of line-of-sight availability over multiple time windows, e.g., to maintain a record of the historical channel stability of the wireless channel. This may allow the wireless device to determine when channel stability has changed (e.g., when line-of-sight is lost or gained). The wireless device may use such information to determine when to perform certain wireless link maintenance operations. For example, quickly initiating beamforming selection, antenna selection, and/or other such operations after a line-of-sight blockage occurs may allow for the wireless device to quickly adjust to the new channel conditions, potentially avoiding wireless link breakage and/or otherwise improving link quality.

The techniques described herein may be implemented in and/or used with a number of different types of devices, including, but not limited to, cellular phones, portable media players, portable gaming devices, tablet computers, wearable computing devices, remote controls, wireless speakers, set top box devices, television systems, and/or computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings, in which.

Figure 1:
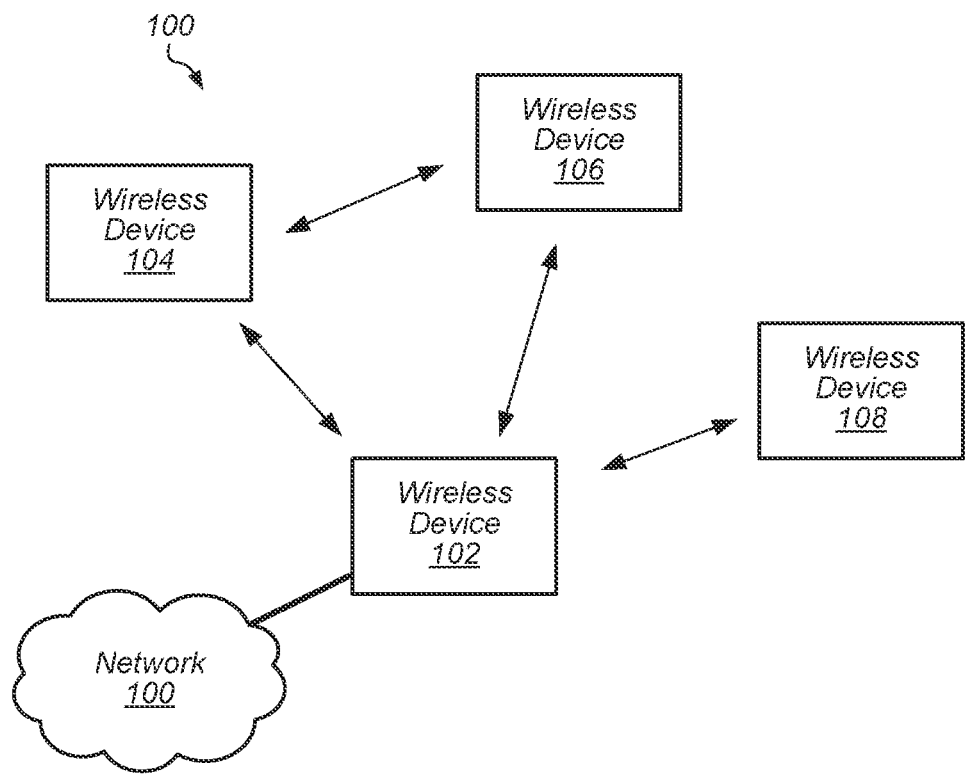
FIGS. 1-2 illustrate exemplary (and simplified) wireless communication systems.

While the features described herein are susceptible to various modifications and alternative forms, specific embodiments thereof are shown by way of example in the drawings and are herein described in detail. It should be understood, however, that the drawings and detailed description are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems or devices that perform wireless communications. A STA can be portable (or mobile) or may be stationary or fixed at a certain location. Examples of STAs include mobile telephones or smart phones (e.g., iPhone™, Android™-based phones), portable gaming devices (e.g., Nintendo DS™ PlayStation Portable™, Gameboy Advance™, iPhone™), laptops, PDAs, portable Internet devices, music players, data storage devices, or other handheld devices, etc.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases, be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, 802.11ad, 802.11 ay, and/or other IEEE 802.11 standards. IEEE 802.11 technology may also be referred to as "Wi-Fi" or "wireless local area network (WLAN)" technology.

Figure 2:
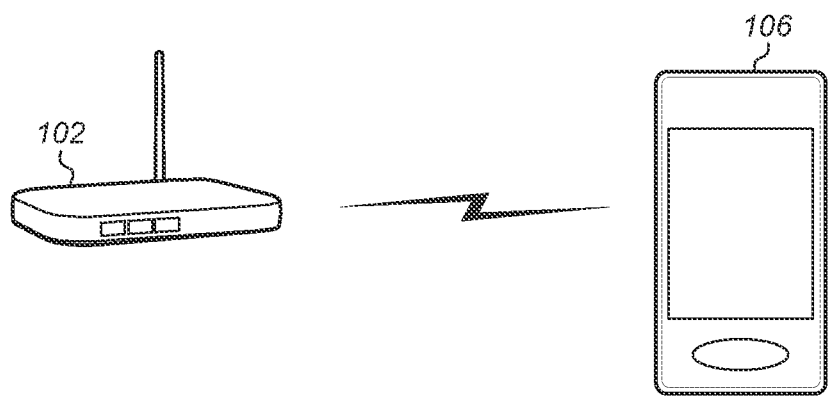

FIGS. 1-2—Communication System

FIG. 1 illustrates an exemplary (and simplified) wireless communication system 100. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any number) of wireless devices.

As shown, the exemplary wireless communication system 100 includes multiple wireless devices 102, 104, 106, and 108 which communicate over a transmission medium. At least in some instances, the transmission medium may cover, or may include at least a portion of, the electromagnetic spectrum in approximately the millimeter wavelength range. Other spectrum portions are also possible. Some or all of the wireless devices may be substantially mobile devices. Alternatively, or in addition, some or all of the wireless devices may be substantially stationary.

The wireless devices 102, 104, 106, and 108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102, 104, 106, and 108 may be configured to implement various embodiments described herein, for example including performing non-line-of-sight detection, among various other techniques.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102, 104, 106, and 108 may be capable of communicating using multiple wireless communication standards. For example, one or more of the wireless devices 102, 104, 106, and 108 may be configured to communicate using at least one wireless networking protocol (e.g., Wi-Fi or WLAN) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 5G NR, 3GPP2 CDMA2000 (e.g., 1×RTT, 1×EV-DO, HRPD, eHRPD), etc.). Any or all of wireless devices 102, 104, 106, and 108 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates an exemplary wireless communication system 200 in which aspects of the system 100 of FIG. 1 according to one possible implementation are represented. As shown, in the illustrated system wireless device 106 may be a (potentially mobile) station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a wearable device, a computer or a tablet, or virtually any type of wireless device. The AP 102 may be an access point device with Wi-Fi communication capability such as a wireless router or other wireless access point, although other embodiments are also envisioned.

Either or both of the AP 102 and the STA 106 may include a processor (processing element) that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array), an integrated circuit, and/or any of various other hardware components that are configured to perform (e.g., individually or in combination) any of the method embodiments described herein, or any portion of any of the method embodiments described herein, may be included as part of the AP 102 and/or the STA 106.

Figure 3:
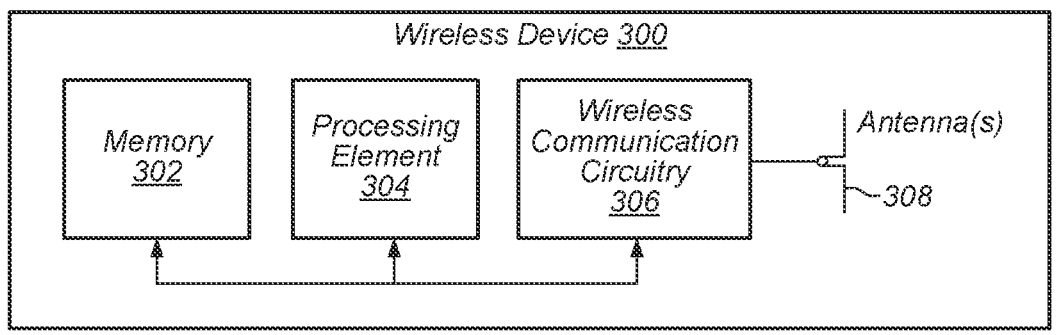
FIG. 3 illustrates a block diagram of an exemplary wireless device.

FIG. 3—Exemplary Block Diagram of a Wireless Device

FIG. 3 illustrates an exemplary block diagram of a wireless device 300 which may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element (processor) 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.), and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing various embodiments described herein.

Figure 4:
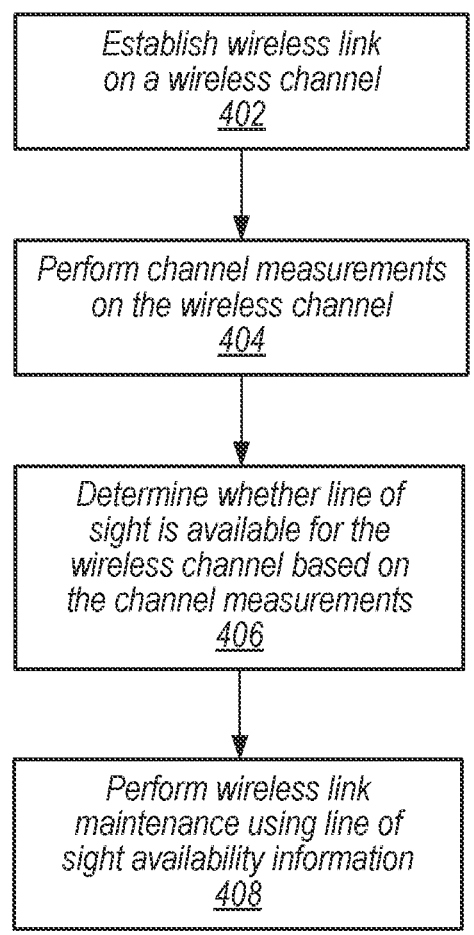
FIG. 4 is a flowchart diagram illustrating an exemplary method for performing non-line-of-sight detection.

FIG. 4—Non-Line-of-Sight Detection

Certain high frequency spectrum portions, which may commonly be referred to as millimeter wave (or mmWave) bands, such as 60 GHz, may be more vulnerable to channel propagation loss than other (e.g., lower frequency) spectrum portions. Wireless communication techniques that utilize mmWave bands may attempt to overcome the potentially high channel propagation loss using beamforming techniques, e.g., to steer transmissions towards narrow spatial directions using phased-array antennas. However, wireless links formed using such techniques may still be significantly affected by line-of-sight blockages. For example, if a line-of-sight blockage occurs, signal strength may decrease precipitously, which in turn result in link quality decreasing substantially or even breaking.

Accordingly, FIG. 4 is a flowchart diagram illustrating a scheme for detecting when line-of-sight is and is not available for a wireless channel, and for performing link maintenance using such line-of-sight availability information. The scheme may be used for performing wireless communication in a wireless communication system, such as an IEEE 802.11 wireless communication system, according to some embodiments. In various embodiments, some of the elements (or operations) of the methods shown may be performed concurrently, in a different order than shown, may be substituted for by other method elements, or may be omitted. Additional method elements may also be performed as desired.

Aspects of the method of FIG. 4 may be implemented by a wireless device, such as the devices 102, 104, 106, and 108 and/or device 300 illustrated in and described with respect to FIGS. 1-3, or more generally in conjunction with any of the computer circuitry, systems, devices, elements, or components shown in the Figures, among others, as desired. For example, a processor (and/or other hardware) of such a device may be configured to cause the device to perform any combination of the illustrated method elements and/or other method elements.

Note that while at least some elements of the method of FIG. 4 are described in a manner relating to the use of communication techniques and/or features associated with IEEE 802.11 specification documents, such description is not intended to be limiting to the disclosure, and aspects of the method of FIG. 4 may be used in any suitable wireless communication system, as desired. As shown, the method may operate as follows.

A ("first") wireless device may establish a wireless link with another ("second") wireless device on a wireless channel (402). The wireless link may be a 802.11 based wireless link, such as an IEEE 802.11ad or IEEE 802.11ay wireless link, that is established in a millimeter wave frequency band, such as 60 GHz, as one possibility. Other types of wireless links (e.g., that may also be significantly affected by whether line-of-sight is available) are also possible.

The first wireless device may perform channel measurements for the wireless channel (404). The channel measurements may include any of various possible channel measurements, and may possibly depend at least in part on the type of wireless link. According to some embodiments, the channel measurements may include a signal to noise ratio (SNR) for the wireless channel, and a channel impulse response (CIR) for the wireless channel. Other types of channel measurements are also possible.

The channel measurements may be performed using training information provided by the second wireless device, at least in some instances. For example, in a IEEE 802.11 based system, the training information could include a channel estimation field (CEF), which may be known a-priori by the first wireless device, and may be received as a training bit sequence with each frame transmitted by the second wireless device. Other types of signals (e.g., any of various types of reference or pilot signals, or possibly even data signals) may also or alternatively be used to perform the channel measurements, according to various embodiments.

In some instances, as part of the channel measurement or as a separate operation, the wireless device may further derive one or more metrics based at least in part on the channel measurements. For example, in some instances, the wireless device may calculate a standard deviation of the SNR for the wireless channel. Such a metric may be useful as a measure of the channel stability; for example, higher standard deviation values for the channel SNR may be indicative of a more unstable channel than lower standard deviation values. As another possibility, the wireless device may estimate a channel delay spread for the wireless channel based at least in part on the CIR for the wireless channel. For example, the wireless device may filter the CIR to produce a "sanitized" CIR that includes the maximum amplitude path and any paths with amplitudes within a certain threshold of the maximum amplitude while excluding any more weakly reflected signals and noise, e.g., by removing delay paths with amplitudes that are smaller than a maximum delay path amplitude for the CIR by more than a specified amplitude difference threshold. The wireless device may then determine the root mean square delay spread of the filtered CIR, and use the resulting value as the estimated channel delay spread.

The wireless device may determine whether line-of-sight is available for the wireless channel, based at least in part on the channel measurements and/or one or more metrics derived from the channel measurements (406). The determination may generally be based on one or more measures of overall channel stability, e.g., possibly in addition to one or more overall signal strength and/or quality indicators, at least according to some embodiments. For example, at least in some instances, as previously noted herein, a wireless channel on which line-of-sight availability has a significant impact may experience substantially greater channel instability when line-of-sight is unavailable than when line-of-sight is available.

As one possible approach to such determination, a decision tree classifier may be used to determine whether line-of-sight is available for the wireless channel using the values of the gathered metrics. For example, the decision tree classifier may be trained to generate one or more sets of conditions characteristic of a wireless channel with line-of-sight available (e.g., conditions characteristic of high channel stability), and/or one or more sets of conditions characteristic of a wireless channel with line-of-sight not available (e.g., conditions characteristic of low channel stability), e.g., using controlled offline measurements. The channel measurements and/or related metrics may thus be used to classify the wireless channel as having line-of-sight available or not available in accordance with the decision tree classifier.

As a specific example, consider a classification algorithm in which two sets of conditions are configured. The first set of conditions may include the standard deviation of the estimated SNR of the wireless channel being below a first SNR standard deviation threshold and the SNR of the wireless channel being above a SNR threshold. The second set of conditions may include the standard deviation of the estimated SNR of the wireless channel being below a second SNR standard deviation threshold (e.g., which may be higher than the first SNR standard deviation threshold), the estimated delay spread being below a delay spread threshold, and the SNR being above the SNR threshold. In this example scenario, the wireless device may determine that line-of-sight is available for the wireless channel if either of the first set of conditions or the second set of conditions is met, and may determine that line-of-sight is not available for the wireless channel if both the first set of conditions and the second set of conditions are not met.

Note that the preceding example is provided by way of explanation only, and that any of various classification algorithms (e.g., using machine learning approaches and/or non machine learning approaches) may be used to determine line-of-sight availability for the wireless channel using the channel measurements, metrics derived from the channel measurements, and/or any of various other possible considerations.

The wireless device may perform such channel measurements and determine whether line-of-sight is available for the wireless channel for each of multiple time windows, in some instances. For example, the wireless device may continuously monitor and evaluate the wireless channel, such that the time windows are contiguous in time with each other, as one possibility. As another possibility, the wireless device may monitor and evaluate the wireless channel in a periodic and/or event-driven manner, such that the time windows are not contiguous in time with each other.

According to some embodiments, the wireless device may track whether line-of-sight was available in one or more previous time windows, when determining whether line-of-sight is available in a given time window. For example, in some instances, the wireless device may store information indicating whether line-of-sight was available for the wireless channel in the immediately previous time window, and may use such information to determine whether line-of-sight availability has changed (e.g., from available to unavailable, or from unavailable to available) from the immediately previous time window to the current time window.

The wireless device may perform wireless link maintenance using the line-of-sight availability information (408). The line-of-sight availability information may be used to determine when to perform certain wireless link maintenance operations, in some instances. For example, the wireless device may determine whether to trigger beamforming selection, antenna selection, and/or any of various other possible operations based at least in part on whether line-of-sight is available for the wireless channel.

Note that in some instances, the determination may be based at least in part on whether line-of-sight availability has changed. For example, if line-of-sight is not available for the wireless channel for a time window after line-of-sight is available for the wireless device for an immediately previous time window, the wireless device may determine to perform beamforming selection and/or antenna selection. As another possibility, if line-of-sight is available for the wireless channel for a time window after line-of-sight is not available for the wireless device for an immediately previous time window, the wireless device may determine to perform beamforming selection and/or antenna selection.

Performing such link maintenance operations based on line-of-sight availability information may improve the effectiveness of such link maintenance operations, e.g., as compared to other approaches to determining when to perform such link mainenance operations, at least in some instances. For example, it may commonly be the case that use of a beamforming and/or antenna arrangement selected while line-of-sight is available may result in lower SNR than one or more alternate beamforming and/or antenna arrangements if a line-of-sight blockage occurs, such that triggering beamforming selection and/or antenna selection upon detection of a line-of-sight blockage may result in an immediate improvement in link quality, possibly including preventing link breakage. Similarly, use of a beamforming and/or antenna arrangement selected while line-of-sight is unavailable may result in lower SNR than one or more alternate beamforming and/or antenna arrangements if line-of-sight is regained, such that triggering beamforming selection and/or antenna selection upon detection of line-of-sight becoming available after a period of unavailability may result in an immediate improvement in link quality.

According to some embodiments, the beamforming selection may include evaluating multiple possible transmit and receive beam combinations, and selecting a transmit and receive beam combination based at least in part on evaluating the possible transmit and receive beam combinations. For example, the beam combinations may be evaluated using a beam sweeping procedure to determine a beam combination that provides the highest signal strength between the first wireless device and the second wireless device, and the beam combination that provides the highest signal strength between the first wireless device and the second wireless device may be selected.

In a similar manner, the antenna selection may include evaluating multiple possible antenna array configurations, and selecting an antenna array configuration based at least in part on evaluating the possible antenna array configurations. For example, the antenna array configurations may be evaluated to determine an antenna array configuration that provides the highest signal strength between the first wireless device and the second wireless device, and the antenna array configuration that provides the highest signal strength between the first wireless device and the second wireless device may be selected.

Thus, using the method of FIG. 4, a wireless device may be able to determine whether line-of-sight is available for a wireless channel using physical layer channel measurements, and to adjust its operation to quickly adapt to the current line-of-sight availability (or lack thereof), at least according to some embodiments. At least in some instances, this may reduce the likelihood that a wireless link established on the wireless channel will break, and/or generally improve link quality over the course of a wireless communication session on the wireless channel, e.g., particularly if the wireless channel is highly sensitive to line-of-sight availability.

FIGS. 5-15—Additional Information

FIGS. 5-15 and the following information are provided as being illustrative of further considerations and possible implementation details relating to the method of FIG. 4, and are not intended to be limiting to the disclosure as a whole. Numerous variations and alternatives to the details provided herein below are possible and should be considered within the scope of the disclosure.

The multi-GHz spectrum at the millimeter wave (mm-Wave) frequency band (e.g., 60 GHz) may be capable of supporting "wire-like" data communication speeds (e.g., in the range of gigabits per second, as one possibility). As there may be a substantial amount (e.g., up to 14 GHz) of such spectrum available for use in an unlicensed manner, such mmWave communication may provide a foundation for a variety of applications, potentially including (but not limited to) uncompressed video streaming, untethered virtual/augmented reality, wireless data centers, etc. Multiple standardization efforts, such as IEEE 802.11ad, 802.11ay, 802.15.3c, and ECMA, may be tailored to support high speed, low-latency applications, potentially capable of providing greater than 100 Gbps of raw physical layer (PHY) bit-rate.

However, the short wavelengths (e.g., 5 mm at 60 GHz) compared to Wi-Fi signals communicated at lower frequency ranges (e.g., 2.4 GHz, 5 GHz) may render 60 GHz links relatively vulnerable to channel propagation loss. For example, in some instances, a 60 GHz link may suffer from 21.6 dB greater signal strength loss compared to GHz Wi-Fi. It may be the case that mmWave devices can overcome the high channel propagation loss at 60 GHz bands by using phased-array antennas to steer RF energy towards narrow spatial directions (e.g., beamforming). However, 60 GHz links formed via such fine-grained beams may be severely affected during blockages. For example, when a human blocks such a beam, the 60 GHz signal strength can drop by more than 15 dB, at least in some instances. Accordingly, designing algorithms that can detect blockages between two communicating 60 GHz devices may be particularly useful for providing an effective 60 GHz wireless communication framework.

In particular, providing the capability to detect blockages may improve the ability of a wireless device to determine when to perform various link maintenance operations and/or other activities associated with the 60 GHz wireless communication. One such operation may include beamforming selection. For example, consider that IEEE 802.11ad/ay standards may support a beamforming training process to discover the highest signal strength transmit and receive beams between a pair of wireless devices. However, triggering beamforming very frequently may result in significant overhead, which may have a significant impact on delay sensitive applications (e.g., VR/AR applications, in some instances). Conversely, when beamforming selection is not triggered when needed (e.g., when the link is blocked), the 60 GHz wireless communication performance may decrease significantly. Accordingly, using a blockage detection algorithm may allow a wireless device to effectively defer beamforming selection when there is a clear line-of-sight (LOS) path between wireless devices communicating in the 60 GHz frequency range, and rapidly trigger beamforming selection upon detecting a blockage (e.g., in non-line-of-sight (NLOS) conditions).

Another operation that may benefit from blockage detection capabilities may include antenna selection. As previously noted, mmWave devices may generally include multiple antennas, e.g., to support beamforming operations. Within the beamforming operations, a mmWave device may select the antenna arrays having the strongest received power. When the received power decreases (e.g., due to blockages), the system may need to switch to another antenna array to be able to sustain good performance. To this end, a LOS/NLOS detection algorithm may be used to rapidly trigger antenna selection when a wireless device changes from LOS conditions to NLOS conditions, potentially before the mmWave link breaks.

Accordingly, techniques are described herein for differentiating between LOS and NLOS settings. In a LOS setting, there may be a clear LOS path between two wireless devices communicating in mmWave spectrum (e.g., an IEEE 802.11 ay access point and client device). In a NLOS setting, either the LOS path may be blocked (e.g., by a human or other physical barrier), or the transmitter and receiver beams do not align with each other, resulting in performance degradation. The techniques may make use of the observations that a 60 GHz channel may generally be more stable in LOS conditions than in NLOS conditions, with the SNR being dominated by the LOS path, and that blockages may cause a more significant SNR degradation in comparison to distance.

More specifically, the techniques described herein may include collecting channel measurements (e.g., SNR and CIR) over a short time window. The 60 GHz wireless multipath environment may be extracted from the channel (CIR) measurements. The channel stability may be estimated by calculating the SNR standard deviation and the channel delay spread. The estimated channel stability may then be compared with the channel stability in LOS settings (which may be determined in advance, e.g., from test data, simulations, etc.), using a decision tree. The decision tree may thus classify settings as LOS or NLOS settings. The techniques may further be used to trigger beamforming selection and/or antenna selection, e.g., depending on the classification of the current setting.

While LOS detection techniques are described herein primarily with respect to IEEE 802.11ad and 802.11ay communication systems for explanatory purposes, it should again be noted that the techniques described herein may be applicable to a variety of wireless communication systems, in particular including various millimeter-wave communication technologies (e.g., IEEE 802.11 ad/ay, 802.15.3c, ECMA, etc.). IEEE 802.11ad may support 2.16 GHz channel bandwidth communication, with PHY rates up to 7 Gbps. IEEE 802.11ay may be considered a successor of 802.11ad, and may support PHY rates greater than 100 Gbps, at least in some instances. Both 802.11ad and 802.11 ay devices may utilize phased array antennas to steer RF energy towards narrow spatial directions (e.g., use beamforming techniques) to overcome the relatively high channel propagation loss of the 60 GHz bands.

In more detail, the millimeter-wave radios may use phased array beamforming to focus the RF energy to a particular direction. For a 1 dimensional linear phased-array antenna, the gain pattern of the $m^{th}$ beam can be expressed as:

$$A_m(\theta) = \sum_{n=1}^{N} w(n, m) \cdot e^{\left(\frac{j2\pi nd\cos\theta}{\lambda}\right)}$$

where N is the number of antenna elements (with uniform separation d) and $\lambda$ is the wavelength of the wireless signal. The weights w(n,m) can be tuned to generate different beams with diverse radiation patterns. At least some phased-array platforms may further use 2 dimensional phased-array antennas, and may be able to generate radiation patterns in both azimuth and elevation directions, e.g., denoted by $A_m(\theta^{az}, \theta^{el})$.

IEEE 802.11ad/ay standards may support a beamforming training (BFT) process to discover the highest signal strength transmit (TX) and receive (RX) beams between a pair of devices. BFT may include a mandatory Sector Level Sweep (SLS) phase, and an optional Beam Refinement Phase (BRP), which may hierarchically evaluate the TX and RX beam combinations, to identify the best combination, as one possible approach to performing BFT.

With respect to channel information, IEEE 802.11ad/ay devices may transmit a training bit sequence x (a Channel Estimation Field or CEF) with every frame. The training sequence may be known a-priori to the receiver. The receiver may be able to use this information to estimate the channel H from the equation:

$$y = H \cdot x + n$$

where y is the received signal and n is a noise factor. From the wireless channel H (using Inverse Fourier Transform), it may be possible to extract the time domain CIR. Note that while use of this equation and approach may represent one possible (e.g., simplified) channel estimation process, alternative (e.g., more complex) approaches are also possible.

As previously noted herein, in LOS conditions, there may be a clear LOS path between two mmWave communicating devices (e.g., an 802.11 ay AP and client). In NLOS, either the LOS path may be blocked, or the transmitter and receiver beams do not align with each other, resulting in performance degradation. According to some embodiments, a LOS/NLOS detection algorithm may be based on the findings that a channel may be more stable in LOS than NLOS conditions, with the SNR being dominated by the LOS path, and that blockages may cause more significant SNR degradation compared to distance.

Figure 5:
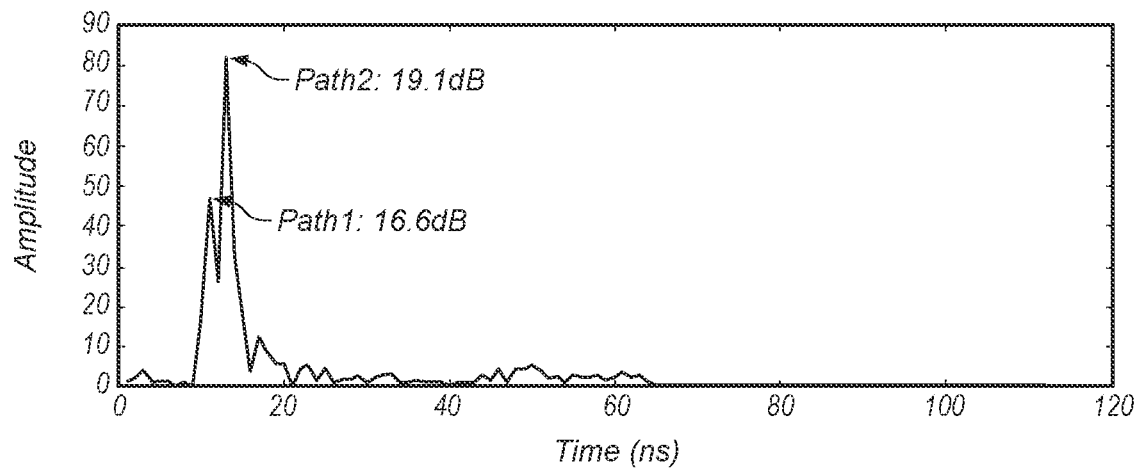
FIGS. 5-6 illustrate exemplary raw and sanitized channel impulse response measurement results for a wireless channel.

In order to estimate channel stability, certain wireless channel measurements may be used, such as SNR and CIR. FIG. 5 illustrates an example of a possible power delay profile computed from a CIR sample, such as might be collected from a 60 GHz 802.11ad device. Each spike in such a power delay profile may represent a signal propagation path, such that in the illustrated example, it may be observed that there are two dominant paths.

Figure 6:
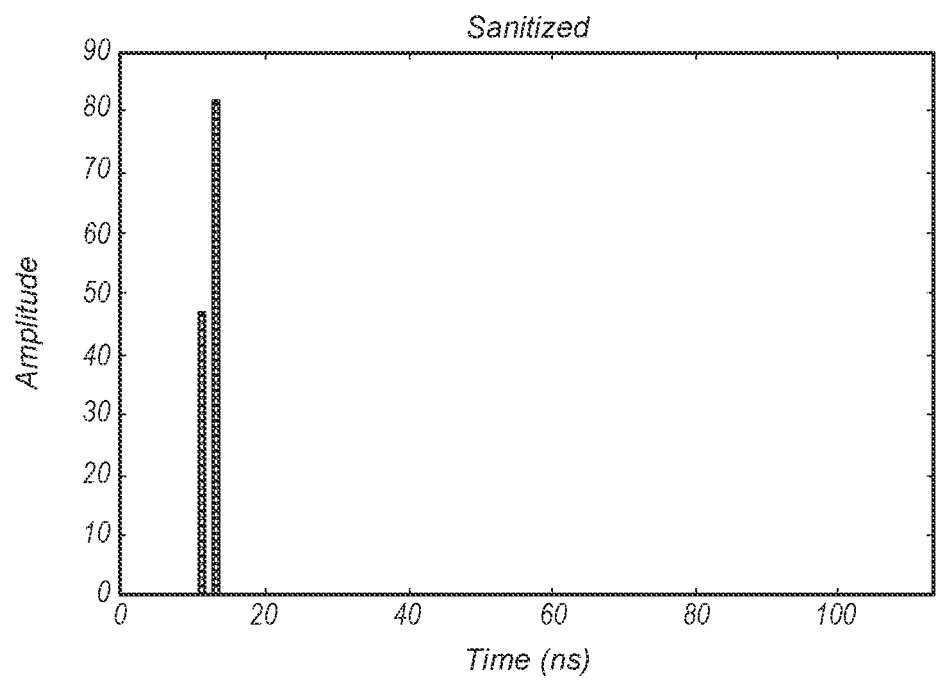

According to some embodiments, it may be useful to utilize a CIR sanitization module, e.g., to separate the dominating paths signals from weak reflected signals and/or noise, which may appear as low amplitude spikes in the CIR power delay profile. For example, the dominating path(s) may be isolated by identifying the local maxima whose amplitude(s) is (are) not much smaller than the maximum amplitude path. Any paths whose amplitude is smaller than the amplitude of the maximum amplitude path by a certain amount (e.g., 5 dB, as one possibility, or any other desired threshold) may be filtered out. For example, FIG. 6 illustrates the same CIR power delay profile as illustrated in Figure after such a CIR sanitization module has been applied to the CIR power delay profile.

According to some embodiments, it may be possible to determine the root mean square (RMS) delay spread for a wireless channel using such a sanitized CIR for the wireless channel. The RMS delay spread ( ) may be a statistical measure of the time dispersion of a channel. It may be defined as:

$$\sigma_\tau = \sqrt{\frac{\sum_{i=1}^{N}(\tau_i - \overline{\tau})^2 P_i}{\sum_{i=1}^{N} P_i}}$$

where $\overline{\tau}$ is the mean excess delay of the multipath components and may be expressed as:

$$\overline{\tau} = \frac{\sum_{i=1}^{N} \tau_i P_i}{\sum_{i=1}^{N} P_i}$$

N may be the number of dominant paths, extracted using a CIR sanitization algorithm such as previously described herein, and $P_i$ may be the power (e.g., in dB) of the path i.

Figure 7:
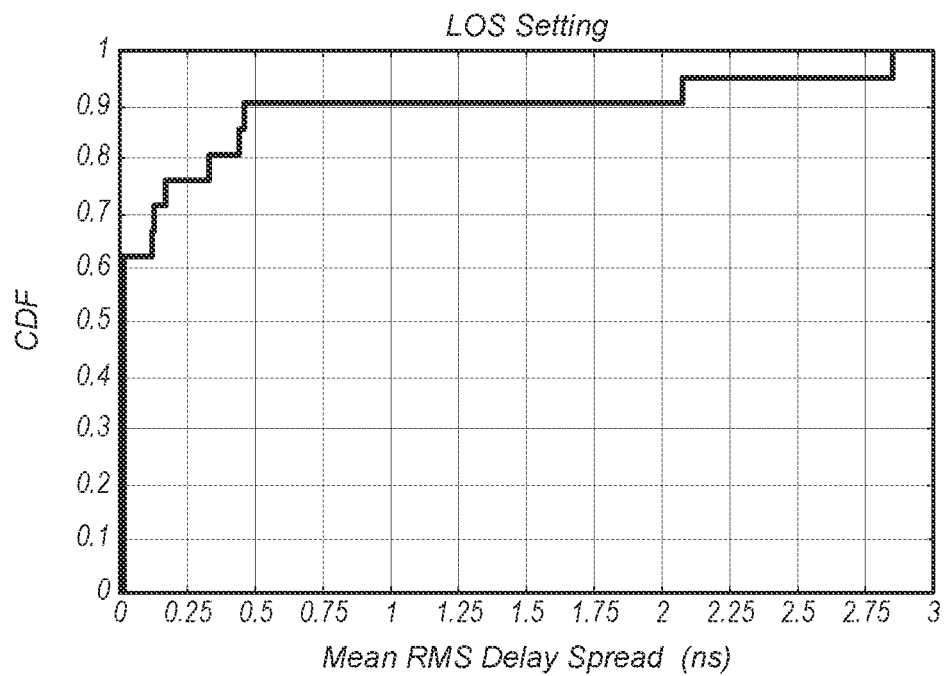
FIGS. 7-8 illustrate exemplary root mean square delay spread measurement results for a wireless channel in line-of-sight and non-line-of-sight conditions.
Figure 8:
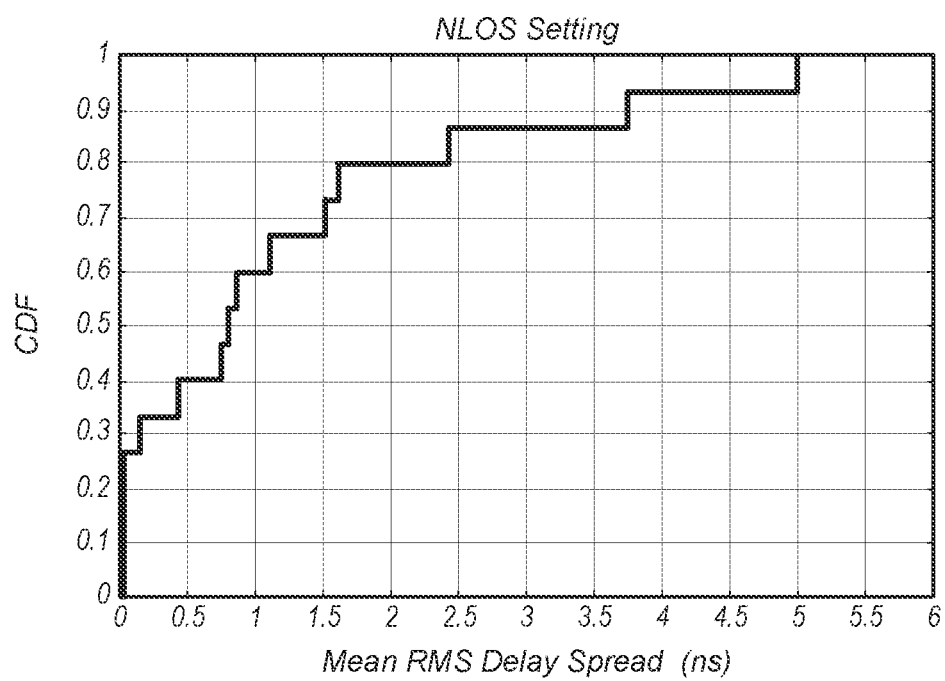

It may be expected that RMS delay spread may typically be higher in NLOS conditions, e.g., in comparison to LOS conditions. FIGS. 7-8 illustrate experimental results showing that RMS delay spread may indeed be higher in NLOS conditions than in LOS conditions, at least in some instances. Specifically, FIG. 7 shows that in 63% of the LOS settings, RMS delay spread is zero, e.g., because in such scenarios there may be only one dominant signal propagation path, at least in the illustrated example results. In contrast, FIG. 8 shows that in 60% of the NLOS settings, RMS delay spread is greater than 0.5 ns, at least in the illustrated example results. Thus, at least in some instances, it may be the case that in NLOS conditions, the number of paths, as well as their delay and amplitude spreads, may be generally higher than in LOS conditions. Note, though, that the illustrated example results shown in FIGS. 7-8 are provided for explanatory purposes only, and that other experimental results for RMS delay spreads for LOS and NLOS settings are also possible.

Figure 9:
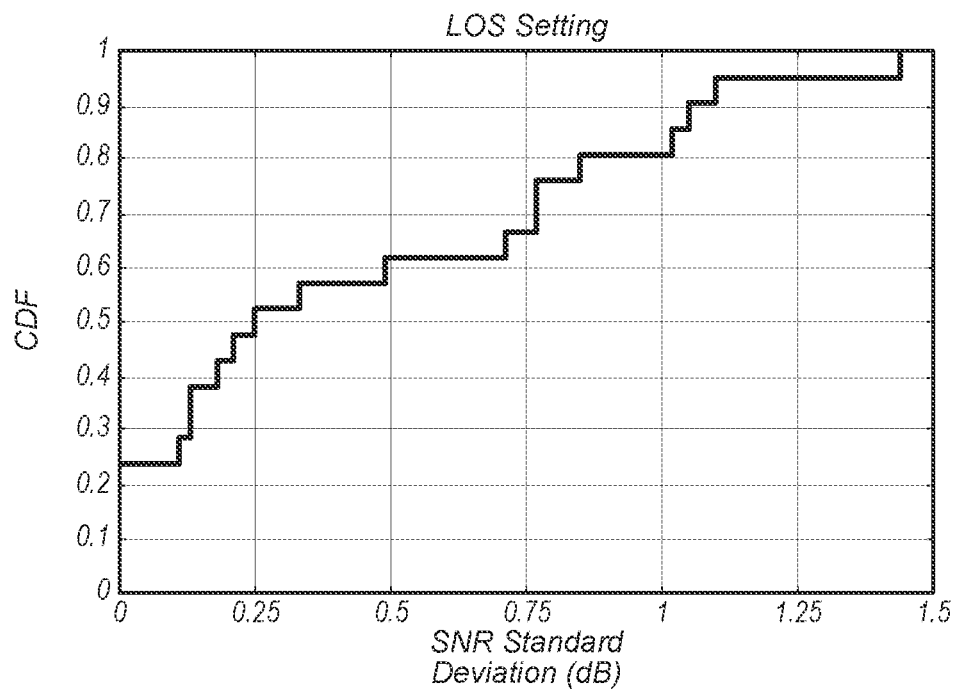
FIGS. 9-10 illustrate exemplary signal to noise ratio standard deviation measurement results for a wireless channel in line-of-sight and non-line-of-sight conditions.
Figure 10:
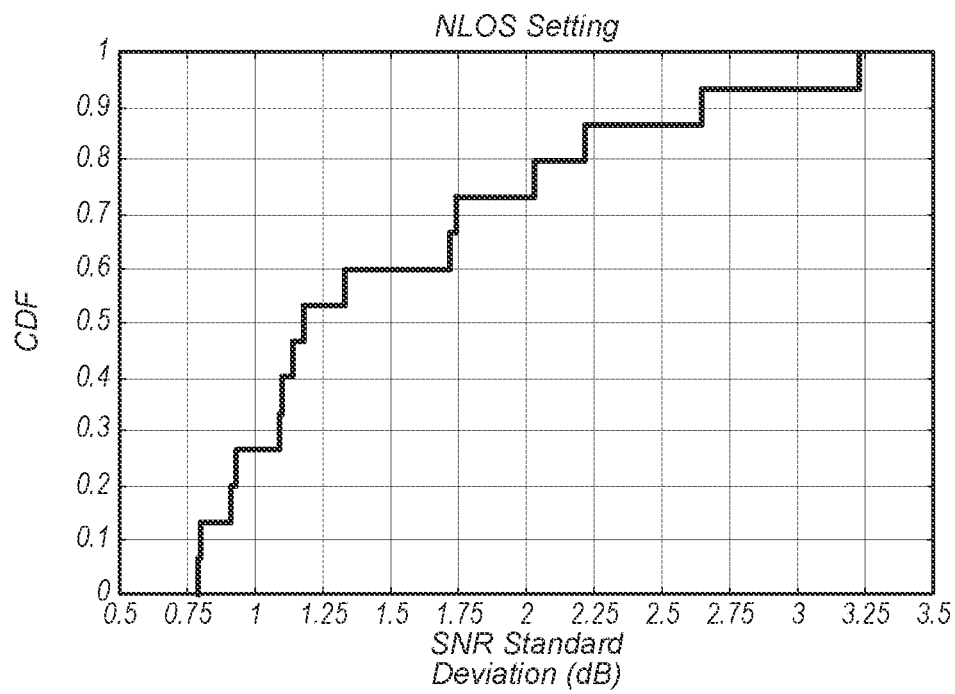

Additionally or alternatively to using RMS delay spread, it may be possible to utilize SNR deviation as a measure of channel stability to facilitate differentiating between LOS and NLOS settings. For example, it may be possible that SNR deviation may be higher in NLOS settings than in LOS settings. This may occur because when the LOS path is open, its amplitude may dominate the SNR, and hence the SNR deviation may be relatively small. The NLOS paths' amplitude deviation may be much higher even with very small changes in the physical environment. FIGS. 9-10 illustrate experimental results showing that SNR standard deviation may indeed be higher in NLOS conditions than in LOS conditions, at least in some instances. Specifically, FIGS. 9-10 show the SNR standard deviation in multiple LOS and NLOS settings, respectively. It may be observed that the SNR standard deviation may be smaller than 0.75 dB in the majority (65%) of the settings, in LOS, while SNR standard deviation in NLOS may always be greater than 0.75 dB, at least in the illustrated example results. Thus, at least in some instances, it may be the case that in NLOS conditions, SNR standard deviation may generally be higher than in LOS conditions. At least in some instances, high SNR standard deviation may be observed in NLOS conditions even if there is not any "obvious" change in the physical environment. It may be the case that similar results can be observed with other deviation metrics, such as Allan Deviation, at least in some instances. It should again be noted that the illustrated example results shown in FIGS. 9-10 are provided for explanatory purposes only, and that other experimental results for SNR deviation metrics for LOS and NLOS settings are also possible.

Figure 11:
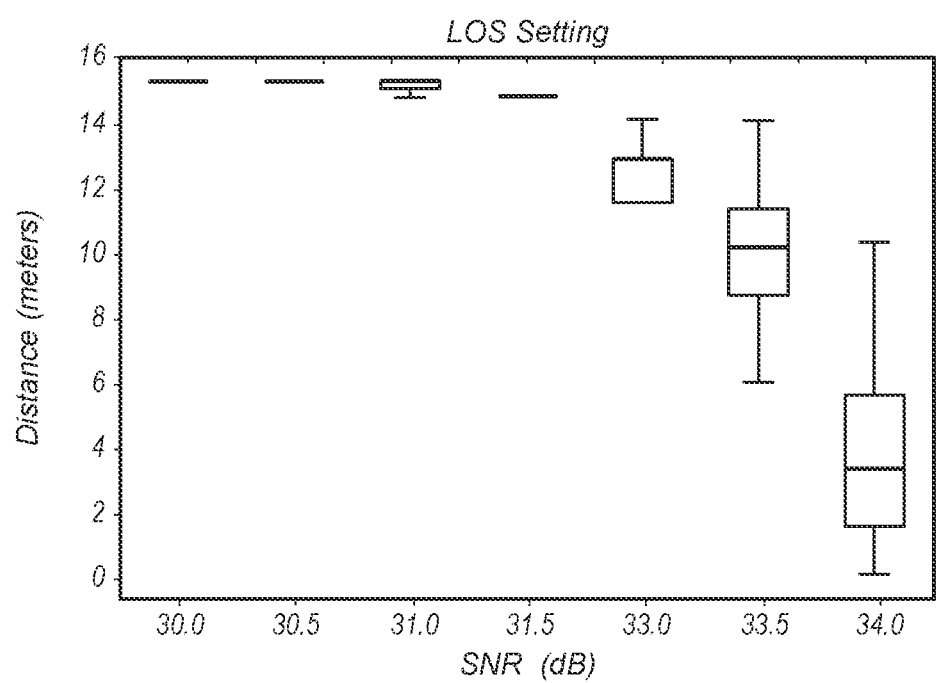
FIG. 11 illustrates signal to noise ratio versus AP-client separation distance according to an exemplary line-of-sight scenario.

As previously noted herein, blockages may cause more significant SNR degradation to a 60 GHz wireless link than path loss caused by distance. FIG. 11 illustrates the SNR for different 60 GHz AP-client distances according to one possible example scenario in which LOS is available. As shown, in the illustrated example, AP-client distance must be greater than 10 meters for SNR to drop by more than 1 dB. Moreover, for 15 meter AP-client distance, SNR may be only slightly smaller than 30 dB. In contrast, it may be the case that LOS blockages can result in SNR drops greater than 16 dB, at least in some instances, and/or may lead to AP-client disconnection. Hence, it may be possible to use the average SNR estimated over a short time window to increase the accuracy of a LOS/NLOS classification system.

Figure 12:
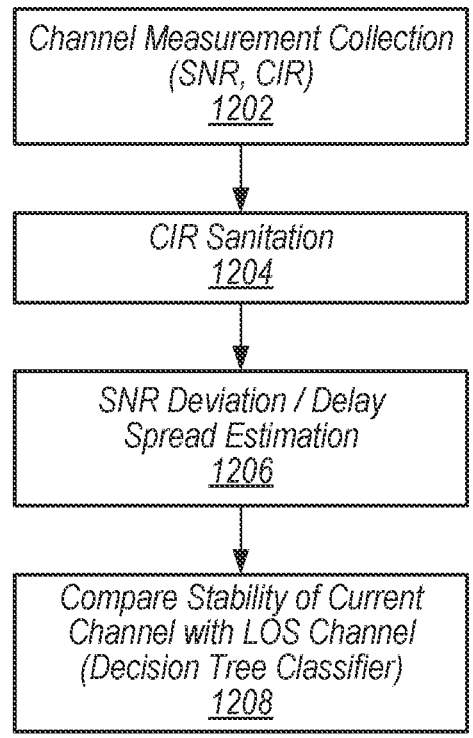
FIG. 12 is a flowchart diagram illustrating further possible aspects of an exemplary method for performing non-line-of-sight detection.

FIG. 12 is a flowchart diagram illustrating one possible method that could be used to classify LOS and NLOS conditions using the measures of channel stability described herein. As shown, channel measurements (e.g., including SNR and CIR measurements) may be collected (1202). The CIR may be sanitized (1204). SNR deviation and RMS delay spread may be estimated (1206). The current channel stability may be compared with conditions considered characteristic of LOS settings, as may have been estimated using controlled offline measurements, e.g., using a decision tree classifier (1208).

Figure 13:
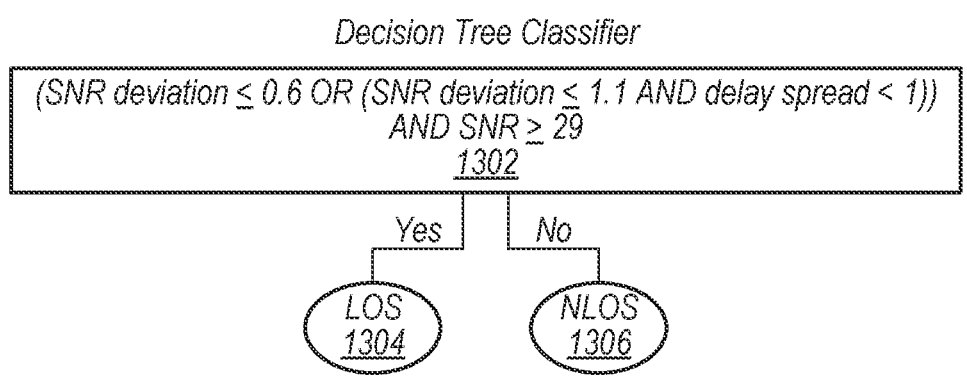
FIG. 13 illustrates an exemplary decision tree classifier that could be used in conjunction with the method of FIG. 12.

FIG. 13 illustrates one possible specific decision tree classifier that could be used in conjunction with the method of FIG. 12, if desired. As shown, the classifier may determine whether SNR deviation is less than or equal to 0.6 and SNR is greater than or equal to 29, or SNR deviation is less than or equal to 1.1 and delay spread is less than 1 and SNR is greater than or equal to 29 (1302). If yes, the decision tree classifier may determine that LOS is available (1304), while if no, the decision tree classifier may determine that LOS is not available (1306). Note that the thresholds used in the example classifier of FIG. 13 are provided by way of example only, and that any number of other threshold values, or conditions more generally, may be used for the decision tree classifier, as desired. For example, for different wireless devices and/or in different conditions, different thresholds may be used, e.g., depending on the antenna and beam characteristics (e.g., number of elements per antenna, beam patterns, etc.), antenna polarization, transmit power used by the communicating devices, etc. Such thresholds may be computed through offline training, and/or in any of various other ways.

Figure 14:
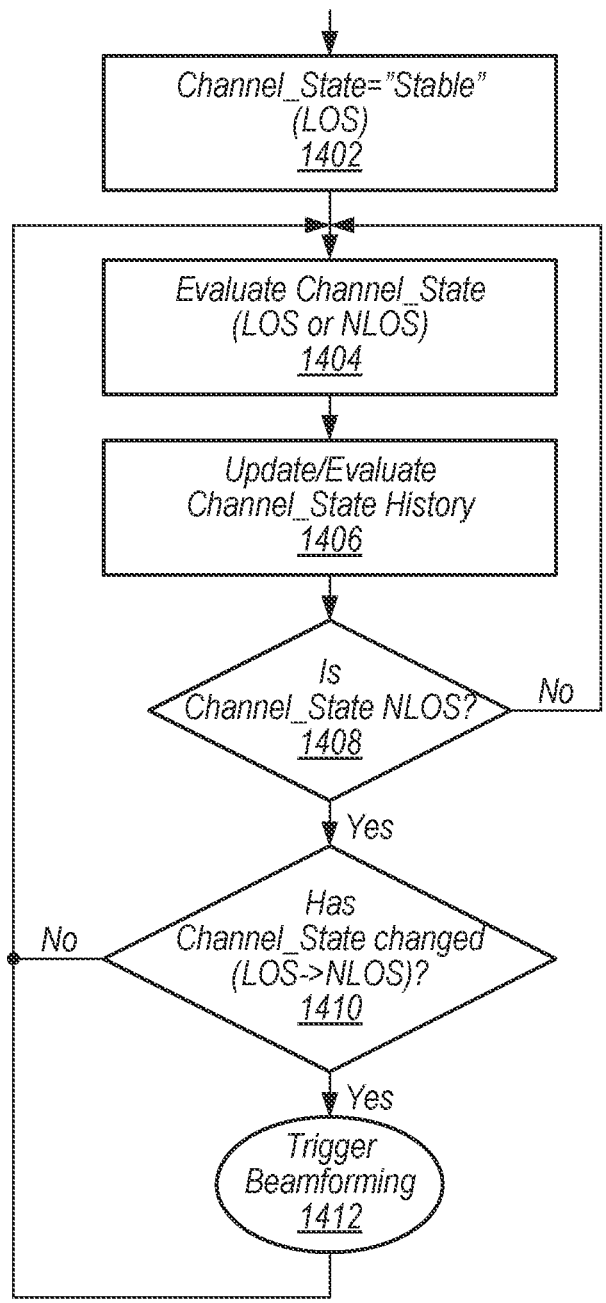
FIG. 14 is a flowchart diagram illustrating an exemplary beamforming trigger algorithm.

The determination of whether a wireless device is in LOS setting or a NLOS setting may be used as a trigger for intelligently determining when to perform beamforming selection. FIG. 14 is a flowchart diagram illustrating one possible method that could be used to determine when to trigger beamforming selection based on LOS/NLOS setting classification. As shown, a wireless device implementing the illustrated method may initially be in a LOS setting, e.g., with a stable channel state (1402). The wireless device may evaluate the mmWave channel state (e.g., using SNR and CIR) for a short term time window to classify the channel state as LOS or NLOS (1404), e.g., using a technique such as described herein in accordance with the method of FIGS. 12-13, as one possibility. The channel state history may be updated, e.g., such that information indicating the current channel state is stored in addition to channel state information for at least the previous time window (1406). The wireless device may determine whether the channel state is NLOS (1408), and if not may again evaluate the channel state for a subsequent time window (1404). If the channel state is NLOS, the wireless device may determine whether the channel state has changed since the previous time window (1410). In particular, if the channel state has changed from LOS (stable channel) to NLOS (unstable channel), the wireless device may trigger beamforming (1412). Otherwise, if the channel state has not changed (e.g., if the channel state is NLOS after previously also being NLOS), the wireless device may again evaluate the channel state for a subsequent time window (1404).

Figure 15:
FIG. 15 illustrates further aspects of an exemplary scenario in which such a beamforming trigger algorithm could be used.

FIG. 15 illustrates an example scenario in which the method of FIG. 14 could be used to trigger beamforming selection, in some instances. As shown, in the example, initially the mmWave link may not be blocked and the channel state history may show "stable" (or LOS). The link may then be blocked, which may result in the NLOS detection module detecting such blockage for two time windows, causing the channel state history to change from [Stable, Stable] to [Unstable, Unstable]. Since the channel state history shows an unstable channel (NLOS) in this scenario, beamforming selection may be triggered, which may in turn improve performance.

Note that antenna selection may additionally or alternatively be triggered based at least in part on LOS/NLOS setting detection techniques, if desired. For example, antenna selection may be performed in conjunction with beamforming selection, in some instances. As another possibility, antenna selection may be triggered separately from beamforming selection, e.g., using a similar or different LOS/NLOS detection based triggering algorithm, in some instances.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus, comprising:
a processor configured to, when executing instructions stored in a memory, perform operations comprising:
performing a channel measurement for a wireless channel;
comparing the channel measurement to one or more threshold conditions associated with a polarization; and
determining whether a line-of-sight (LOS) path is available for the wireless channel based at least in part on the comparison of the channel measurement to the one or more threshold conditions associated with the polarization.

2. The apparatus of claim 1, wherein the one or more threshold conditions further comprise at least one of the following additional threshold conditions:
a number of elements per antenna of the wireless device, one or more beam patterns, or
a transmit power used by the wireless device.

3. The apparatus of claim 1, wherein the at least one processor is further configured to cause the wireless device to:
determine, based at least in part on whether a LOS path is available for the wireless channel, whether to trigger one or more of beamforming selection or antenna selection.

4. The apparatus of claim 1,
wherein the channel measurement comprises a signal to noise ratio (SNR) for the wireless channel,
wherein the processor is further configured to cause the wireless device to calculate a standard deviation of the SNR for the wireless channel,
wherein determining whether a line-of-sight path is available for the wireless channel is further based at least in part on the standard deviation of the SNR for the wireless channel.

5. The apparatus of claim 1,
wherein the channel measurement comprises a channel impulse response (CIR) measurement for the wireless channel,
wherein the processor is further configured to cause the wireless device to estimate a channel delay spread for the wireless channel based at least in part on the CIR measurement for the wireless channel,
wherein determining whether a line-of-sight path is available for the wireless channel is further based at least in part on the channel delay spread for the wireless channel.

6. The apparatus of claim 1, wherein the processor is further configured to cause the wireless device to:
determine whether a line-of-sight path is available for the wireless channel for each of a plurality of time windows.

7. The apparatus of claim 6, wherein the processor is further configured to cause the wireless device to:
perform beamforming selection when a line-of-sight path is not available for the wireless channel for a time window after a line-of-sight path is available for the wireless device for an immediately preceding time window, wherein to perform beamforming selection, the processor is further configured to cause the wireless device to:
evaluate a plurality of transmit and receive beam combinations; and
select a transmit and receive beam combination based at least in part on evaluating the plurality of transmit and receive beam combinations.

8. The apparatus of claim 6, wherein the processor is further configured to cause the wireless device to:
perform antenna selection when a line-of-sight path is not available for the wireless channel for a time window after a line-of-sight path is available for the wireless device for an immediately preceding time window, wherein to perform antenna selection, the processor is further configured to cause the wireless device to:
evaluate at least two possible antenna array configurations for the wireless device; and
select an antenna array configuration for the wireless device based at least in part on evaluating the at least two possible antenna array configurations for the wireless device.

9. The apparatus of claim 1, further comprising:
a radio operably coupled to the at least one processor.

10. A non-transitory computer readable memory medium storing program instructions executable by one or more processors of a user equipment (UE) to cause the UE to:

perform channel measurements for a wireless channel during a first time window;

compare the channel measurements to one or more threshold conditions associated with a polarization; and determine whether a line-of-sight path is available for the wireless channel during the first time window based at least in part on the comparison of the channel measurements for the wireless channel during the first time window to the one or more threshold conditions associated with the polarization.

11. The non-transitory computer readable memory medium of claim 10, wherein the channel measurements comprise a signal to noise ratio (SNR) for the wireless channel and a channel impulse response (CIR) measurement for the wireless channel, and wherein the program instructions are further executable to cause the UE to:

calculate a standard deviation of the SNR for the wireless channel during the first time window; and estimate a channel delay spread for the wireless channel during the first time window based at least in part on the CIR measurement for the wireless channel.

12. The non-transitory computer readable memory medium of claim 11, wherein to determine whether a line-of-sight path is available for the wireless channel during the first time window, and wherein the program instructions are further executable to cause the UE to:

determine whether the standard deviation of the SNR during the first time window is below a SNR standard deviation threshold, whether the estimated channel delay spread during the first time window is below a delay spread threshold, and whether the SNR during the first time window is above a SNR threshold.

13. The non-transitory computer readable memory medium of claim 10, wherein the program instructions are further executable to cause the UE to:

perform channel measurements for the wireless channel during a second time window; and determine whether a line-of-sight path is available for the wireless channel during the second time window based at least in part on the channel measurements for the wireless channel during the second time window.

14. The non-transitory computer readable memory medium of claim 13, wherein the program instructions are further executable to cause the UE to:

determine whether availability of a line-of-sight path for the wireless channel has changed from the first time window to the second time window.

15. The non-transitory computer readable memory medium of claim 10, wherein the one or more threshold conditions further comprise at least one of the following additional threshold conditions:

a number of elements per antenna of the UE, one or more beam patterns, or a transmit power used by the UE.

16. The non-transitory computer readable memory medium of claim 10, wherein the program instructions are further executable to cause the UE to:

determine, based at least in part on whether a LOS path is available for the wireless channel, whether to trigger one or more of beamforming selection or antenna selection.

17. A method, comprising:

performing a channel measurement for a wireless channel;

comparing the channel measurement to one or more threshold conditions associated with a polarization; and determining whether a line-of-sight (LOS) path is available for the wireless channel based at least in part on the comparison of the channel measurement to the one or more threshold conditions associated with the polarization.

18. The method of claim 17, wherein the one or more threshold conditions further comprise at least one of the following additional threshold conditions:

a number of elements per antenna of the wireless device, one or more beam patterns, or a transmit power used by the wireless device.

19. The method of claim 17, further comprising:

determining, based at least in part on whether a LOS path is available for the wireless channel, whether to trigger one or more of beamforming selection or antenna selection.

20. The method of claim 17, wherein determining whether a line-of-sight path is available for the wireless channel is performed for each of a plurality of time windows, wherein for each time window, and wherein the method further comprises:

determining whether availability of a line-of-sight path has changed relative to a most recent previous time window.

\* \* \* \* \*